(12) United States Patent
Konashi et al.

(10) Patent No.: US 11,526,605 B2
(45) Date of Patent: Dec. 13, 2022

(54) EXTRACTION DEVICE, EXTRACTION METHOD, RECORDING MEDIUM, AND DETECTION DEVICE

(71) Applicant: NEC Corporation, Tokyo (JP)

(72) Inventors: Takashi Konashi, Tokyo (JP); Satoru Yamano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 17/042,622

(22) PCT Filed: Apr. 27, 2018

(86) PCT No.: PCT/JP2018/017202
§ 371 (c)(1),
(2) Date: Sep. 28, 2020

(87) PCT Pub. No.: WO2019/207764
PCT Pub. Date: Oct. 31, 2019

(65) Prior Publication Data
US 2021/0141895 A1    May 13, 2021

(51) Int. Cl.
*G06F 21/55* (2013.01)
*H04L 9/36* (2006.01)

(52) U.S. Cl.
CPC ......... *G06F 21/554* (2013.01); *G06F 21/552* (2013.01); *H04L 9/36* (2013.01)

(58) Field of Classification Search
CPC ......... G06F 21/554; G06F 21/552; H04L 9/36
See application file for complete search history.

(56) References Cited

U.S. PATENT DOCUMENTS

| 9,906,545 | B1 * | 2/2018 | Zhao | H04L 63/1425 |
| 10,091,077 | B1 * | 10/2018 | Pukish | H04L 67/12 |
| 2015/0089236 | A1 * | 3/2015 | Han | H04L 63/0227 |
| | | | | 713/168 |
| 2017/0026386 | A1 * | 1/2017 | Unagami | G06F 21/85 |
| 2017/0048241 | A1 | 2/2017 | Tanabe et al. | |

(Continued)

FOREIGN PATENT DOCUMENTS

| JP | 2015-216469 A | 12/2015 |
| JP | 2017-111796 A | 6/2017 |
| JP | 6161837 B1 | 7/2017 |

OTHER PUBLICATIONS

Guiming Shi • Jidong Suo • Chang Liu • Kang Wan • Xiaoying Lv; Moving target detection algorithm in image sequences based on edge detection and frame difference; 2017 IEEE 3rd Information Technology and Mechatronics Engineering Conference (ITOEC) (pp. 740-744); (Year: 2017).*

(Continued)

*Primary Examiner* — Luu T Pham
*Assistant Examiner* — Chao Wang
(74) *Attorney, Agent, or Firm* — Sughrue Mion, PLLC

(57) ABSTRACT

An extraction device includes: at least one memory configured to store instructions; and at least one processor configured to execute the instructions to: sort each set of frames that have the same identifier associated with a node, into frames maintaining a cycle and frames out of the cycle; and extract, as an event rule, a feature of a bit change in a data field related to an event occurrence, from the frames that have the same identifier and are out of the cycle.

8 Claims, 15 Drawing Sheets

(56) References Cited

U.S. PATENT DOCUMENTS

2018/0295147 A1  10/2018  Haga et al.

OTHER PUBLICATIONS

Xian Du • Dua, S.; Salient frame extraction using support vector regression and motion features; Proceedings of the IEEE 2010 National Aerospace & Electronics Conference (pp. 122-125); (Year: 2010).*

Arenas, R. • Finochietto, J.M. • Lopez, R. • Morales, U.; Framer design, verification and prototyping for G.709 optical transport networks; 2011 VII Southern Conference on Programmable Logic (SPL) (pp. 25-30); (Year: 2011).*

Japanese Office Action for JP Application No. 2020-515430 dated Nov. 16, 2021 with English Translation.

International Search Report for PCT Application No. PCT/JP2018/017202, dated Jul. 17, 2018.

English translation of Written opinion for PCT Application No. PCT/JP2018/017202, dated Jul. 17, 2018.

Moyuru Kurita et al., "Method for Anomaly Detection Based on Sequential Pattern of Log and Its Application to CAN Log", Research Report of the Information Processing Society of Japan, Feb. 23, 2017, vol. 2017-DPS-170 No. 28, pp. 1-7.

Tomoyuki Haga et al., "Proposal for Security ECU for Protecting In-Vehicle Networks: Concept for a CAN Protection Method that Reduces Introduction Impact", SCIS 2015, Jan. 20, 2015, 3C2-3, pp. 1-8, Japan.

Jun Yajima et al., "Security CAN Adapter for Enabling Detection of Attacks Using Aperiodic Transmission Messages", SCIS 2016, Jan. 19, 2016, 3F3-1, pp. 1-6, Japan.

Takeshi Kishikawa et al., "Proposal for an Unauthorized ECU Detection Method by CAN Traffic Central Monitoring", SCIS 2016, Jan. 19, 2016, 2F4-4, pp. 1-7, Japan.

Tomohiro Date et al., "Dynamic Rule Generation Using Machine Learning in In-Vehicle LAN Security Gateway", SCIS 2016, Jan. 22, 2016, 3F2-1, pp. 1-6, Japan.

\* cited by examiner

Fig.4A

F: BIT AT SPECIFIC POSITION IS INVERTED AT TIME OF EVENT OCCURRENCE
-: VALUE AT TIME OF EVENT OCCURRENCE IS INDEFINITE

Fig.4B

| ... | 1 | 1 | 0 | 1 | ... | ... | ... | ... | ... |
| ... | 0 | 0 | 1 | 0 | ... | ... | ... | ... | ... |

AT TIME OF EVENT OCCURRENCE, ENUMERATED COMBINATION OF BITS DESIGNATED AS 0 OR 1 IS FORMED

Fig.4C

@: AT TIME OF EVENT OCCURRENCE, IT TAKES SAME VALUE AS LAST VALUE

EXTRACTION DEVICE, EXTRACTION METHOD, RECORDING MEDIUM, AND DETECTION DEVICE

This application is a National Stage Entry of PCT/JP2018/017202 filed on Apr. 27, 2018, the contents of all of which are incorporated herein by reference, in their entirety.

TECHNICAL FIELD

The present disclosure relates to a network in which electronic control units mounted in vehicles or the like communicate with one another, and to an extraction device and the like that detect an illegal frame that is output to the network.

BACKGROUND ART

A plurality of electronic control units (ECUs) is mounted in a vehicle such as an automobile. A network that connects these ECUs is called an in-vehicle network, and frames containing various kinds of data for controlling the vehicle are transmitted and received between the ECUs.

Meanwhile, as the ECUs that have been transmitting and receiving frames in the closed in-vehicle network can be connected to the outside, a risk of the occurrence of a security problem has become higher. For example, in a case where an ECU capable of communicating with the outside is attacked, there is a possibility that an illegal frame will be output to the in-vehicle network, and the vehicle will be illegally controlled.

PTL 1 discloses a technique for detecting such an illegal frame. By this technique, a cycle of frames output from an ECU is registered beforehand, and a check is made to determine whether the detection target frame falls within the registered cycle, so that an illegal frame is detected.

CITATION LIST

Patent Literature

[PTL 1] JP 2017-111796 A

SUMMARY OF INVENTION

Technical Problem

Meanwhile, frames that are output from an ECU include not only frames that maintain the cycle, but also frames that do not fall within the cycle due to an event occurrence such as opening and closing of a door. By the above detection technique, the cyclicity of frames that are output from an ECU is used in detecting an error, and therefore, a frame that does not fall within the cycle cannot be detected as an error.

It is an object of the present disclosure to provide an extraction device and the like capable of detecting an illegal frame that does not fall within a cycle.

Solution to Problem

An extraction device of the present disclosure includes: a frame sorting unit that sorts frames that have the same identifier associated with a node, into frames maintaining a cycle and frames out of the cycle; and a rule extraction unit that extracts the feature of a bit change in a data field related to an event occurrence, from the frames that have the same identifier and are out of the cycle.

An extraction method of the present disclosure includes: sorting frames that have the same identifier associated with a node, into frames maintaining a cycle and frames out of the cycle; and extracting the feature of a bit change in a data field related to an event occurrence, from the frames that have the same identifier and are out of the cycle.

A non-transitory computer-readable recording medium storing a program of the present disclosure, the program causes a computer to: sort frames that have the same identifier associated with a node, into frames maintaining a cycle and frames out of the cycle; and extract a feature of a bit change in a data field related to an event occurrence, from the frames that have the same identifier and are out of the cycle.

Advantageous Effects of Invention

According to the present disclosure, it is possible to detect a fraud on a frame out of a cycle.

BRIEF DESCRIPTION OF DRAWINGS

FIG. 4A is a chart for explaining an example feature of a bit change in a data field.

FIG. 4B is a chart for explaining another example feature of a bit change in a data field.

FIG. 4C is a chart for explaining yet another example feature of a bit change in a data field.

EXAMPLE EMBODIMENTS

An extraction device, a detection device, and the like according to the present example embodiment will be described with reference to an example applied to an in-vehicle network for automobiles. The following is a description using Controller Area Network (CAN), which is an in-vehicle network. Although the present example embodiment is suitable for an in-vehicle network, it does not prevent application of the present example embodiment to other networks such as a network for industry.

FIRST EXAMPLE EMBODIMENT

Figure 1:
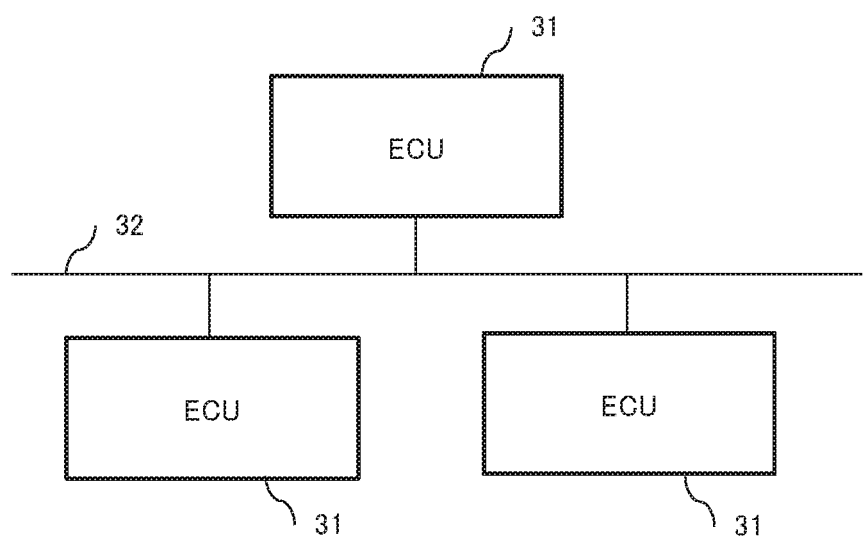
FIG. 1 is a block diagram showing the configuration of CAN.

An extraction device according to a first example embodiment is now described with reference to drawings. First, CAN is briefly described. FIG. 1 is a block diagram showing the configuration of CAN. As shown in FIG. 1, a plurality of electronic control units (ECUs) 31 is connected to a controller area network (CAN) bus 32. CAN is a kind of communication protocol for in-vehicle networks, and is widely used in vehicle powertrain systems and vehicle body systems, for example. An ECU 31 incorporates a signal from a sensor mounted on the vehicle or a signal accompanying a switch operation of the vehicle into a frame, and outputs the frame to the CAN bus 32. The ECUs 31 and the CAN bus 32 are also referred to as nodes and a network bus, respectively.

Figure 2:
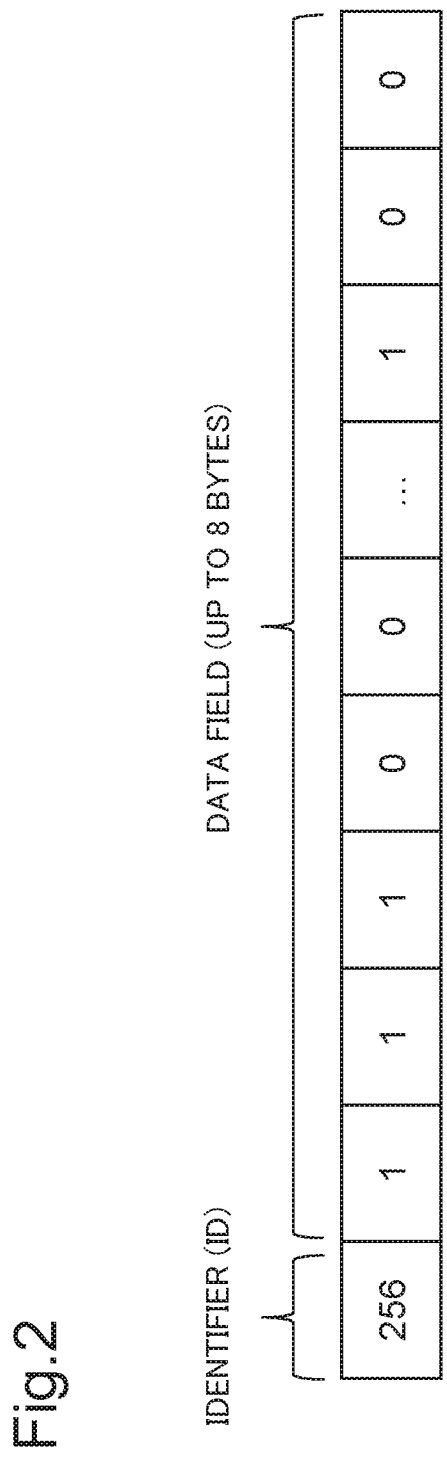
FIG. 2 is a diagram for explaining the frame structure of CAN.

FIG. 2 is a diagram for explaining the frame structure of CAN. A CAN frame is formed primarily with an identifier (ID: identification) and a data field of up to eight bytes (64 bits). As for identifiers (hereinafter referred to simply as IDs), a unique ID is assigned to each ECU that outputs a frame. With this arrangement, an ID can identify the ECU that has output the frame, or the type of the data contained in the frame. The type of the data is steering angle, engine speed, vehicle speed, or door open/closed state, for example.

However, the data type assigned to each ID varies with each automobile manufacturer. For example, while one automobile manufacturer assigns an ID "256" to engine speed, another manufacturer may not use the ID "256" for engine speed, or may assign the ID "256" to steering angle.

The data field indicates the content of data output by the ECU. The data field of a CAN frame normally includes a plurality of 0/1 flags each indicating a state with one bit, a plurality of portions each indicating a state with a plurality of bits, and a plurality of portions each indicating continuous values with a plurality of bits. Note that the information indicated by each bit in a data field is not disclosed by automobile manufacturers.

<Extraction Device>

Figure 3:
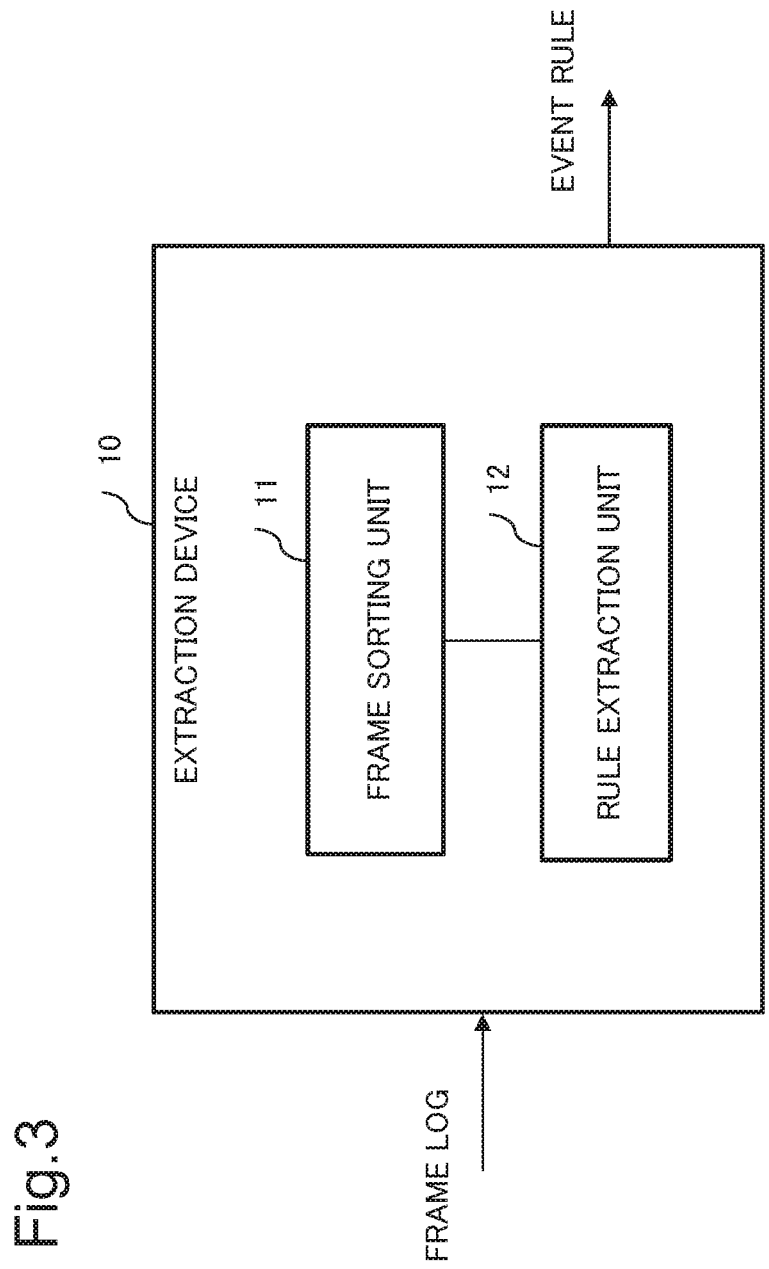
FIG. 3 is a block diagram showing an example configuration of an extraction device according to a first example embodiment.

An extraction device according to the first example embodiment is now described with reference to drawings. FIG. 3 is a block diagram showing the configuration of an extraction device 10 according to the first example embodiment. The extraction device 10 shown in FIG. 3 includes a frame sorting unit 11 and a rule extraction unit 12. First, the extraction device 10 acquires a frame log. The frame log is a set of frames an ECU 31 in the in-vehicle network shown in FIG. 1 has output to the CAN bus, for example. The frame log also includes time stamps (reception times) corresponding to the respective frames received by the other ECUs 31.

In a case where the extraction device 10 is connected to the CAN bus 32, each frame received by the extraction device may be acquired as a frame log. Alternatively, in a case where the extraction device 10 is not connected to the CAN bus 32, the set of frame received by a device connected to the CAN bus 32, such as an ECU 31, may be used as a frame log.

(Frame Sorting Unit 11)

The frame sorting unit 11 sorts the frames of each identical ID output from an ECU 31, into frames that maintain the cycle and frames that are out of the cycle. The frames that maintain the cycle are frames output from the ECU 31 in a constant cycle. It is possible to acquire the cycle of frames with an identical ID by calculating the reception interval of the frames with the identical ID from the reception times (time stamps) of the frames with the identical ID included in the frame log.

Specifically, the frame sorting unit 11 generates a set of frames for each ID, on the basis of the IDs contained in the frames of the frame log. The frame sorting unit 11 further extracts the frame cycle for each ID, on the basis of the reception times associated with the frames of the respective IDs. The frame sorting unit 11 sorts the set of frames having the same ID into a set of frames maintaining the cycle and a set of frames out of the cycle, on the basis of the extracted cycle for the ID. The set of frames out of the cycle is a set of frames obtained by excluding the set of frame maintaining the cycle from the set of frames with the same ID. The set of frames that have the same ID and are out of the cycle may include an illegal frame, as well as a normal frame caused by an event occurrence. The frame sorting unit 11 sends the sorted set of frames that have the same ID and are out of the cycle, to the rule extraction unit 12.

(Rule Extraction Unit 12)

From the set of frames that have the same ID and are out of the cycle, the rule extraction unit 12 extracts, as an event rule, the feature of a bit change in the data field between the frames. Specifically, the rule extraction unit 12 arranges the set of frames that have the same ID and are out of the cycle in order of reception on the basis of the time stamps, and analyzes the feature of a bit change in the data fields before and after the frames.

FIGS. 4A, 4B, and 4C are charts for explaining the features of bit changes in the data fields of different IDs. A first bit change feature shown in FIG. 4A relates to an event occurrence, and is an example in which the bit at a specific position in a data field is inverted before and after a frame. In the chart, "F" indicates bit inversion, and "-" indicates that the value at the time of an event occurrence is indefinite. The example in FIG. 4A shows that the fourth bit in the data field is inverted due to an event occurrence.

A second bit change feature shown in FIG. 4B relates to an event occurrence, and is an example in which a predetermined enumerated combination of bits designated as "0" or "1" in the data field. The predetermined enumerated combination is a bit string such as "1101" or "0010", for example.

A third bit change feature shown in FIG. 4C relates to an event occurrence, and is an example in which the bit at a specific position in the data field takes the same value as the value immediately before the event occurrence.

The rule extraction unit 12 analyzes the feature of the bit change in the data field before and after an event occurrence, and, on the basis of the analysis result, extracts the feature of the bit change as an event rule associated with the ID.

The event rule extracted by the rule extraction unit 12 serves as an index for determining a frame to be a normal frame output from the ECU 31 due to an event occurrence, among the frames that have the same ID and are out of the cycle.

Figure 5:
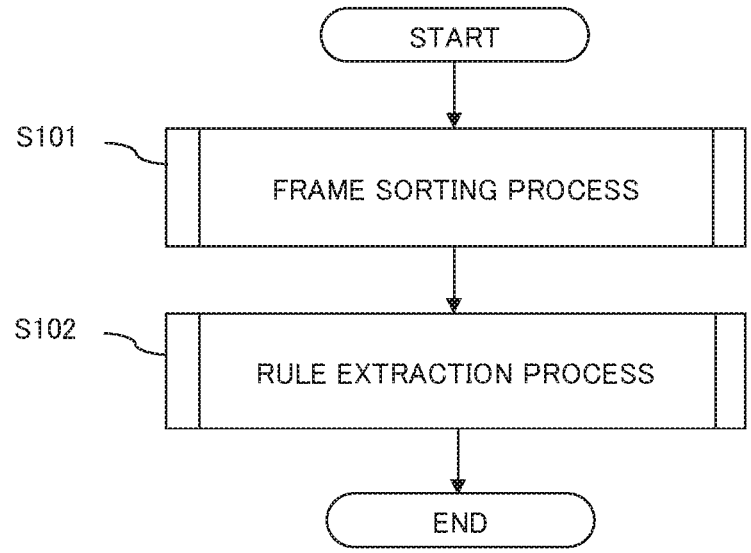
FIG. 5 is a flowchart showing an operation of an extraction device 10 according to the first example embodiment.

Next, operations of the extraction device of the first example embodiment are described, with reference to drawings. FIG. 5 is a flowchart showing an operation of the extraction device 10 according to the first example embodiment. First, the extraction device 10 acquires a frame log. The frame sorting unit 11 of the extraction device 10 performs a frame sorting process (step S101).

Figure 6:
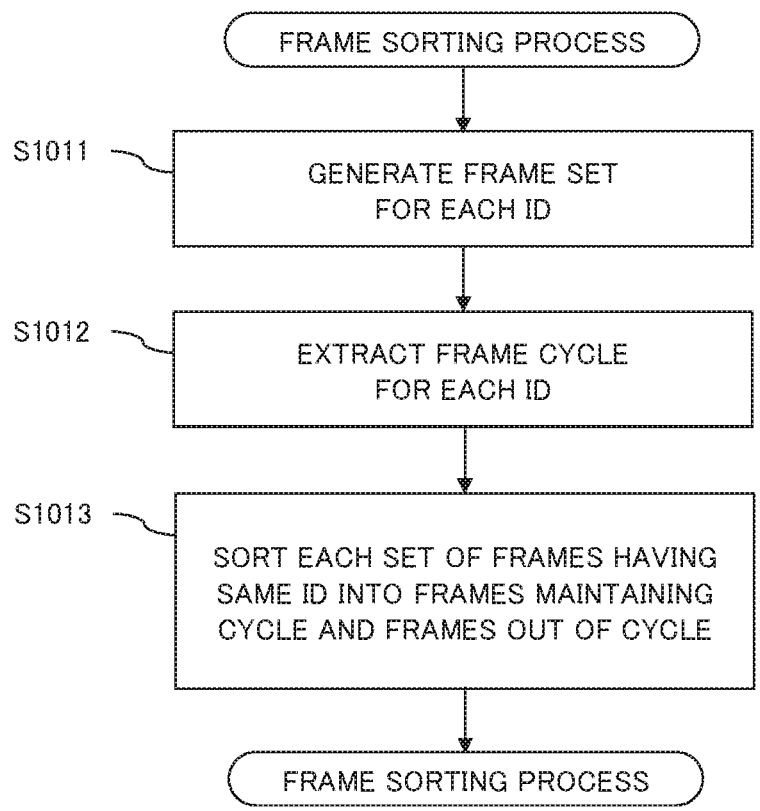
FIG. 6 is a flowchart showing an example operation in a frame sorting process.

FIG. 6 is a flowchart showing an example operation in the frame sorting process. The frame sorting unit 11 generates a set of frames for each ID, on the basis of the IDs contained in the frames of the frame log (step S1011). The frame sorting unit 11 extracts the frame cycle for each ID, on the basis of the reception times associated with the frames of the respective IDs (step S1012). The frame sorting unit 11 sorts the set of frames having the same ID into the frames maintaining the cycle and the frames out of the cycle, on the basis of the extracted cycle for the ID (step S1013). The set of frames maintaining the cycle is excluded from the set of frames having the same ID, so that the frames out of the cycle form a set of frames out of the cycle.

The rule extraction unit 12 then performs a rule extraction process for extracting an event rule indicating the feature of a bit change in the data field between frames, from the set of frames that have the same ID and are out of the cycle (step S102).

Figure 7:
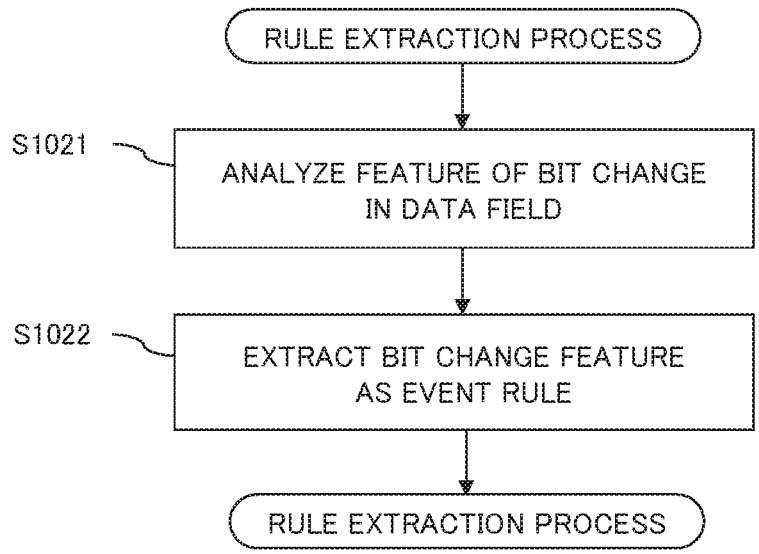
FIG. 7 is a flowchart showing an example operation in a rule extraction process.

FIG. 7 is a flowchart showing an example operation in the rule extraction process. The rule extraction unit 12 arranges the set of frames that have the same ID and are out of the cycle in order of reception on the basis of the time stamps, and analyzes the feature of a bit change in the data field between frames (step S1021). On the basis of the analysis result, the rule extraction unit 12 extracts the feature of the bit change as an event rule associated with the frames of the same ID (step S1022). The extraction device 10 outputs the extracted event rule. The event rule may be output by the rule extraction unit 12.

(Effects of the First Example Embodiment)

With the extraction device 10 of the first example embodiment, it is possible to detect a fraud on a frame out of the cycle. This is because the extraction device 10 extracts an event rule for the node outputting frames maintaining the cycle to identify frames that are output due to an event occurrence and are out of the cycle. Specifically, this is because the frame sorting unit 11 sorts frames with the same identifier associated with a node into frames maintaining the cycle and frames out of the cycle, and the rule extraction unit 12 extracts an event rule indicates the feature of a bit change in the data field between frames, from the frames that have the same identifier and are out of the cycle.

SECOND EXAMPLE EMBODIMENT

<Detection Device>

Next, a detection device and a detection method according to a second example embodiment are described with reference to drawings. A detection device of the second example embodiment has a function of determining whether a frame out of the cycle is a normal frame or an illegal frame, using an event rule extracted by the extraction device of the first example embodiment.

Figure 8:
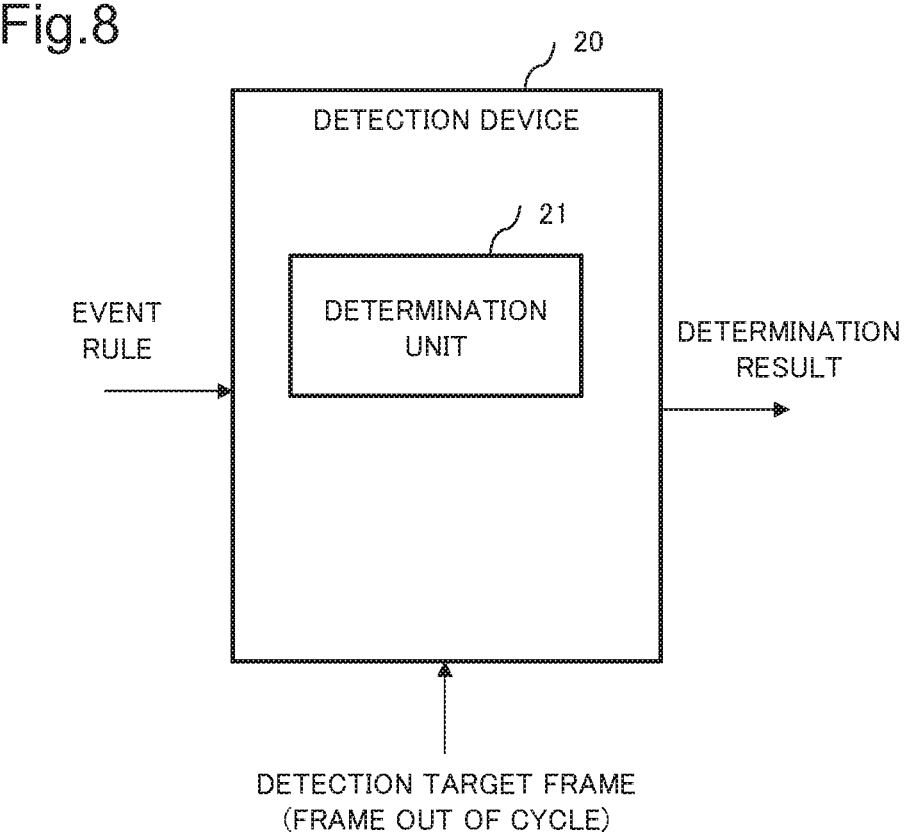
FIG. 8 is a block diagram showing an example configuration of a detection device according to a second example embodiment.

FIG. 8 is a block diagram showing the configuration of a detection device 20 according to the second example embodiment. The detection device 20 according to the second example embodiment includes a determination unit 21. The detection device 20 acquires the detection target frame, and an event rule extracted by the extraction device 10 of the first example embodiment. The detection target frame in the second example embodiment is a frame out of the cycle.

The determination unit 21 compares the data field of the frame out of the cycle with the event rule extracted by the extraction device 10, to determine whether the data field matches the event rule. In a case where the data field matches the event rule, the determination unit 21 determines the frame to be a normal frame. In a case where the data field does not match the event rule, the determination unit 21 determines the detection target frame to be an illegal frame. An output unit (not shown) of the detection device outputs the determination result.

Figure 9:
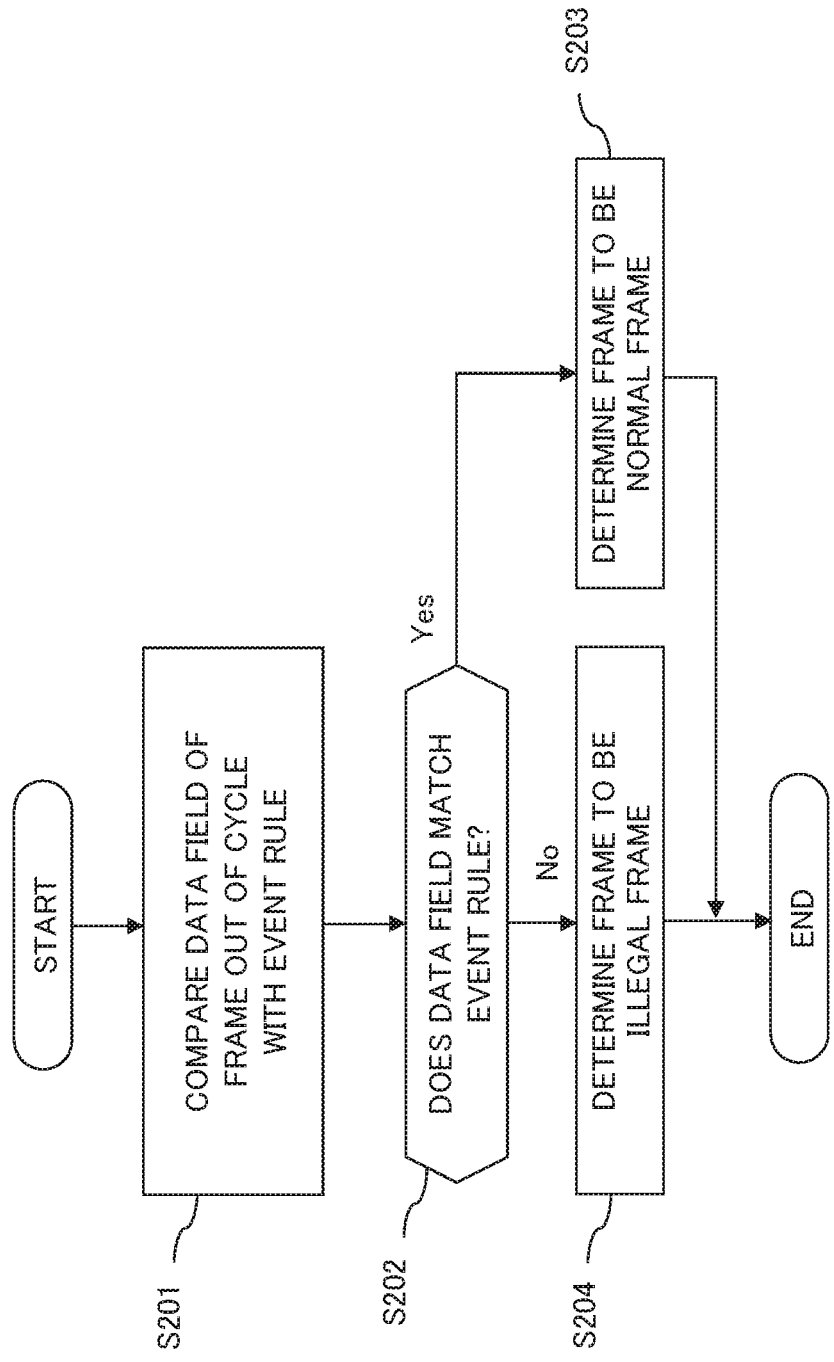
FIG. 9 is a flowchart showing an example operation of the detection device according to the second example embodiment.

Next, an operation of the detection device of the second example embodiment is described, with reference to a drawing. FIG. 9 is a flowchart showing an operation of the detection device 20 according to the second example embodiment. The detection device 20 acquires an event rule extracted by the extraction device 10. The detection device 20 further acquires a frame out of the cycle as the detection target frame.

The determination unit 21 compares the data field of the frame out of the cycle with the event rule (step S201). Specifically, the determination unit 21 checks whether the bit string of the data field of the frame out of the cycle matches the event rule.

If the bit string matches the event rule (Yes in step S202), the determination unit 21 determines the frame out of the cycle to be a normal frame (step S203). If the bit string does not match the event rule (No in step S202), on the other hand, the determination unit 21 determines the frame out of the cycle to be an illegal frame (step S204). After the determination in step S203 or S204, the output unit (not shown) of the detection device 20 outputs a determination result.

(Effects of the Second Example Embodiment)

With the detection device of the second example embodiment, it is possible to detect a fraud on a frame out of the cycle. This is because, in a case where the data field of the frame that is the detection target and is out of the cycle does not match the event rule extracted by the extraction device, the determination unit determines the detection target frame to be an illegal frame. Thus, even in a case where a node outputting a frame out of the cycle is attacked and turns into an illegal node, an illegal frame output from the node can be detected.

THIRD EXAMPLE EMBODIMENT

Figure 10:
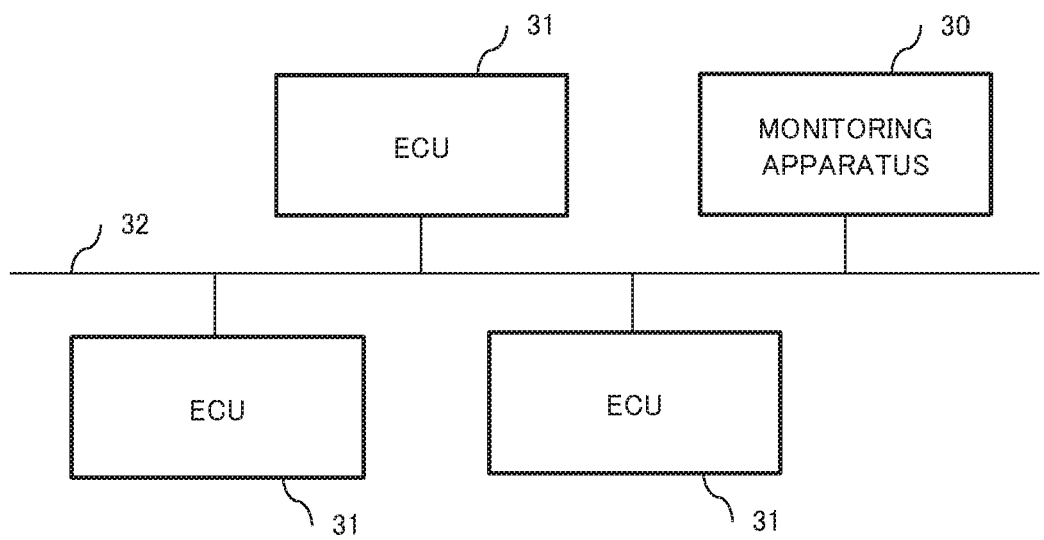
FIG. 10 is a block diagram showing a configuration in which a monitoring apparatus according to a third example embodiment is applied to CAN.

A monitoring apparatus according to a third example embodiment is described, with reference to drawings. FIG. 10 is a block diagram showing a configuration in which a monitoring apparatus according to the third example embodiment is applied to CAN. ECUs 31 and a CAN bus 32 shown in FIG. 10 are the same as those described in the first example embodiment, and therefore, detailed explanation thereof is not made herein. A monitoring apparatus 30 is communicably connected to the CAN bus 32. The monitoring apparatus 30 can receive a frame output from an ECU 31, like the other ECUs 31. In a frame log that is a set of frames received by the monitoring apparatus 30, the IDs of the received frames are associated with time stamps (reception times).

<Monitoring Apparatus>

Figure 11:
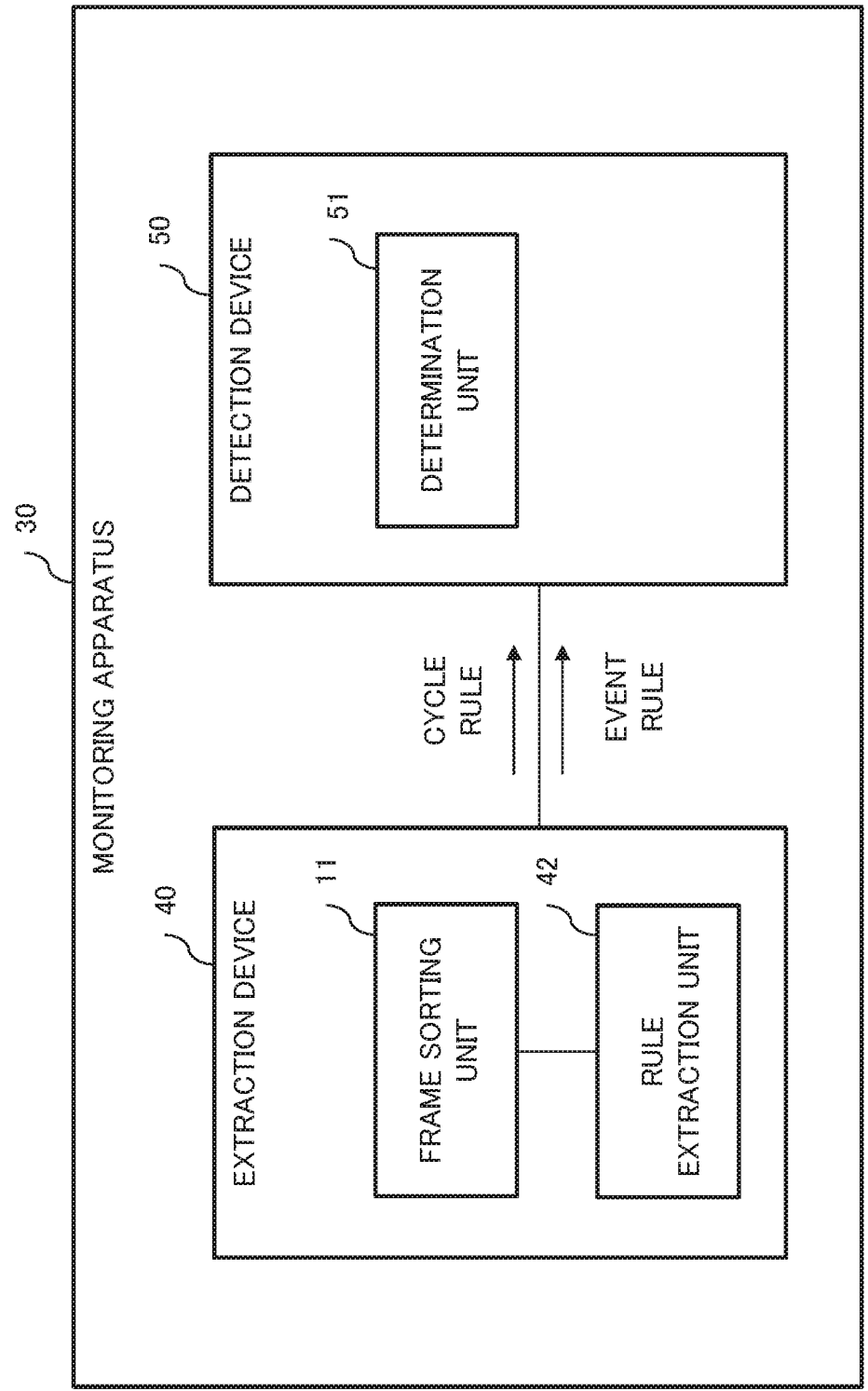
FIG. 11 is a block diagram showing the configuration of a monitoring apparatus according to the third example embodiment.

The configuration of a monitoring apparatus according to the third example embodiment is now described with reference to a drawing. FIG. 11 is a block diagram showing the configuration of the monitoring apparatus 30 according to the third example embodiment. The monitoring apparatus 30 shown in FIG. 11 includes an extraction device 40 and a detection device 50.

Like the extraction device 10 of the first example embodiment, the extraction device 40 included in the monitoring apparatus 30 has a function of extracting an event rule serving as an index of a normal frame for frames that have the same ID and are out of the cycle. In addition to the event rule extracting function, the extraction device 40 of the third example embodiment has a function of extracting a cycle rule for frames that have the same ID and maintain the cycle.

Like the detection device 20 of the second example embodiment, the detection device 25 included in the monitoring apparatus 30 has a function of determining whether a frame out of the cycle is a normal frame or an illegal frame, using the event rule. In addition to the function of determining a frame out of the cycle on the basis of the event rule, the detection device 25 of the third example embodiment has a function of determining whether a frame maintaining the cycle is a normal frame or an illegal frame, using the cycle rule.

In the following description of the extraction device 40 and the detection device 50 of the third example embodiment, detailed explanation of the same functions as those of the extraction device 10 of the first example embodiment and the detection device 20 of the second example embodiment will not be made.

Figure 12:
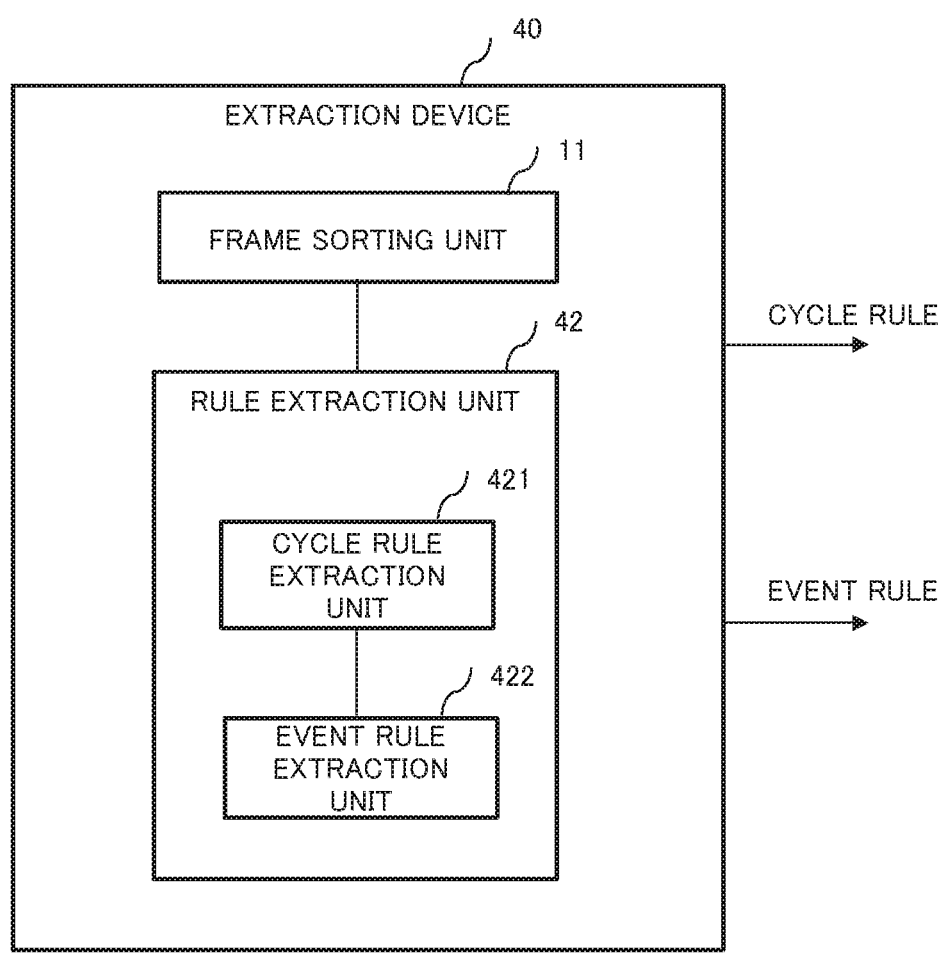
FIG. 12 is a block diagram showing the configuration of an extraction device according to the third example embodiment.

The extraction device 40 according to the third example embodiment is now described with reference to a drawing. FIG. 12 is a block diagram showing the configuration of the extraction device 40 according to the third example embodiment. The extraction device 40 includes a frame sorting unit 11 and a rule extraction unit 42.

The frame sorting unit 11 acquires a frame log, and sorts each set of frames having the same ID into frames maintaining the cycle and frames out of the cycle, as in the first example embodiment. The frame log is a set of frames received and stored by the monitoring apparatus 30 connected to the CAN bus 32.

The rule extraction unit 42 includes a cycle rule extraction unit 421 and an event rule extraction unit 422. The cycle rule extraction unit 421 extracts, as a cycle rule, the relationship between the ID and the cycle contained in the frame log, from ID-based cycle information used by the frame sorting unit 11 at the time of frame sorting. For example, in a case where frames with an ID "420" appear at intervals of 10 ms in the frame log, the cycle rule extraction unit 421 extracts "ID 420: 10 (ms)" as a cycle rule.

Like the rule extraction unit 12 of the first example embodiment, the event rule extraction unit 422 analyzes the feature of a bit change in a data field before and after an event occurrence, and, on the basis of the analysis result, extracts the feature of the bit change as an event rule associated with the ID. The extracted cycle rule and event rule are output to the detection device 50 by an output unit (not shown).

Figure 13:
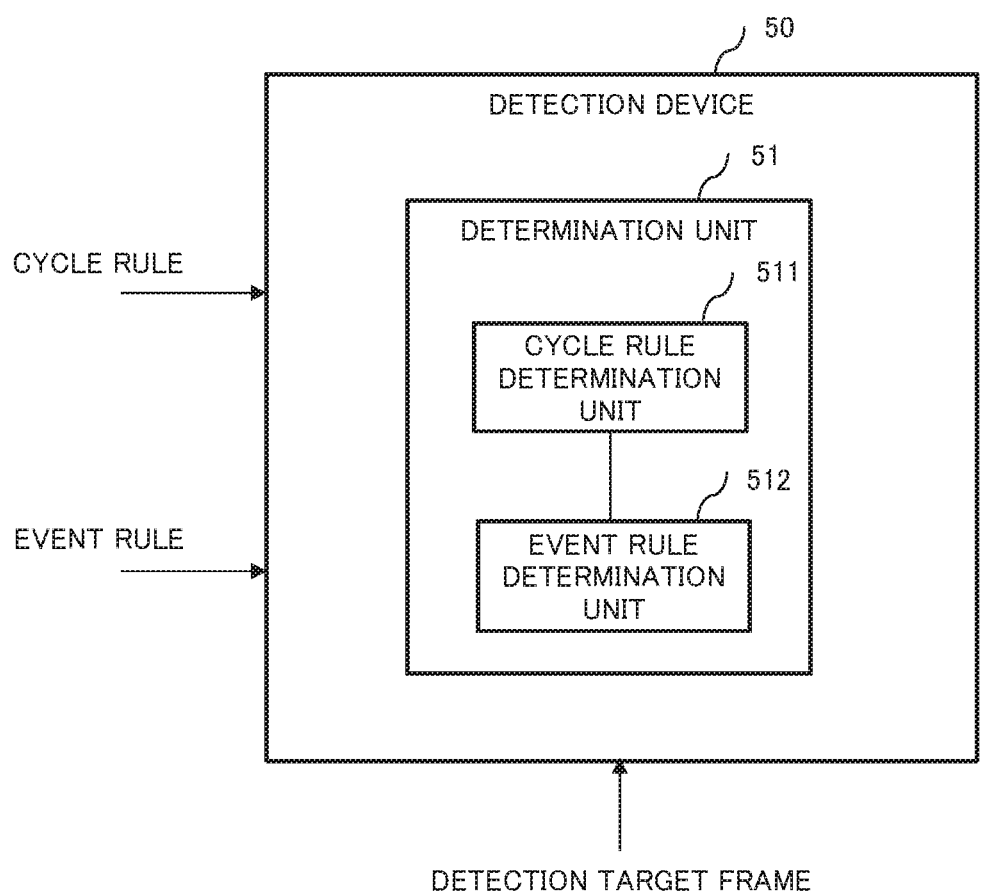
FIG. 13 is a block diagram showing the configuration of a detection device according to the third example embodiment.

The detection device 50 according to the third example embodiment is now described with reference to a drawing. FIG. 13 is a block diagram showing the configuration of the detection device 50 according to the third example embodiment. The detection device 50 includes a determination unit 51. The determination unit 51 includes a cycle rule determination unit 511 and an event rule determination unit 512.

The cycle rule determination unit 511 determines whether a frame maintaining the cycle is a normal frame or an illegal frame, using a cycle rule output by the extraction device 40. Specifically, a check is made to determine whether the detection target frame matches the ID and its cycle included in the cycle rule. Here, the cycle matching may be within a range including an error margin for each cycle. For example, in a case where the cycle is 10 ms, the range is 10 ms±1 ms, and, in a case where the cycle is 500 ms, the range is 500 ms±10 ms.

In a case where the detection target frame matches the cycle or is within the error margin, the cycle rule determination unit 511 determines the frame to be a normal frame. In a case where the detection target frame does not match the cycle or is beyond the error margin, the cycle rule determination unit 511 sends the detection target frame as a frame out of the cycle to the event rule determination unit 512.

The event rule determination unit 512 determines whether a frame out of the cycle is a normal frame or an illegal frame, using an event rule output by the extraction device 40. The determination as to a frame out of the cycle using an event rule at the event rule determination unit 512 is the same as that at the determination unit 21 of the second example embodiment, and therefore, detailed explanation thereof is not made herein.

Figure 14:
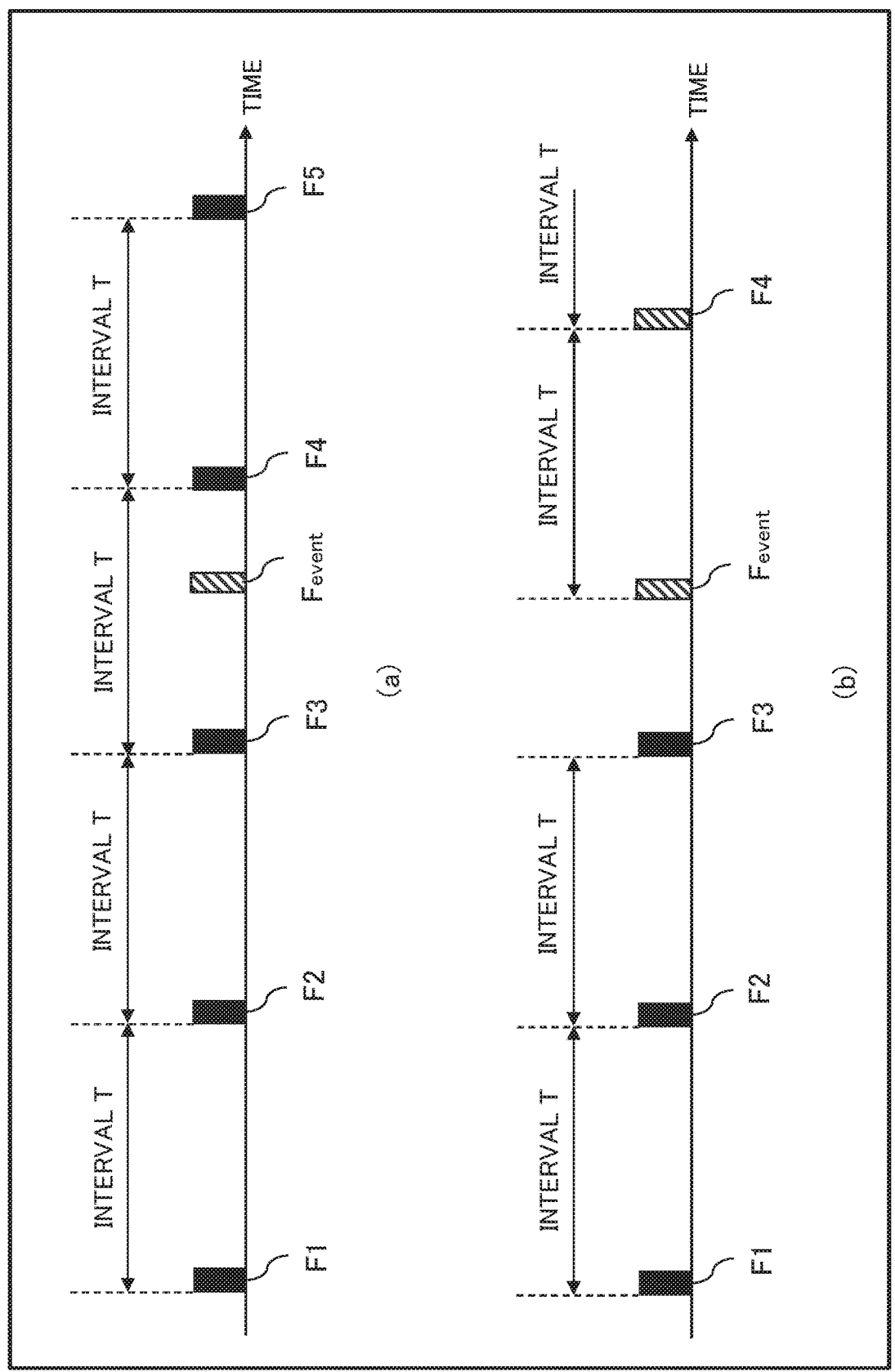
FIG. 14 is a diagram for explaining a change in the base point of frames maintaining a cycle due to an event occurrence.

Here, in some ECUs that output frames maintaining a cycle, the base point of frames to be output after an event occurrence changes due to the event. FIG. 14 is a diagram for explaining a change in the base point of frames maintaining a cycle due to an event occurrence. In FIG. 14, reference numerals F1 to F5 indicate frames that are output by an ECU and maintain a cycle. $F_{event}$ indicates a frame that is output because of an event occurrence.

As for the ECU that outputs the frames shown a part (a) in FIG. 14, the frame $F_{event}$ is output when an event occurs following a frame F3, but a frame F4 that is output after that and maintains the cycle is output while maintaining an interval T from the frame F3.

As for the ECU that outputs the frames shown a part (b) in FIG. 14, on the other hand, the frame $F_{event}$ is output when an event occurs following the frame F3, and the frame F4 that is output after that and maintains the cycle is output after an interval T from the frame $F_{event}$. In the case of the part (b) in FIG. 14, the frame F3 and the frames following the frame F4 that are output thereafter are determined to be frames that are not in synchronization with the cycle by the cycle rule determination unit 511.

Therefore, after determining a frame out of the cycle to be a normal frame, the event rule determination unit 512 updates the base point of the cycle determination to that of the frame at the time of event occurrence. Specifically, the event rule determination unit 512 can check the cyclicity of the frames after the frame F4, using the time information about the frame $F_{event}$ at the time of event occurrence as the base point of the cycle.

(Effects of the Third Example Embodiment)

With the extraction device 40 of the third example embodiment, it is possible to detect a fraud on a frame out of the cycle. This is because the extraction device 40 extracts an event rule for the node outputting frames maintaining the cycle to identify frames that are output due to an event occurrence and are out of the cycle.

With the detection device 50 of the third example embodiment, it is possible to detect a fraud on a frame out of the cycle. This is because, in a case where the data field of the frame that is the detection target and is out of the cycle does not match the event rule extracted by the extraction device 40, the determination unit 51 determines the detection target frame to be an illegal frame. Thus, even in a case where a node outputting a frame out of the cycle is attacked and turns into an illegal node, an illegal frame output from the node can be detected.

(Hardware Configuration)

Figure 15:
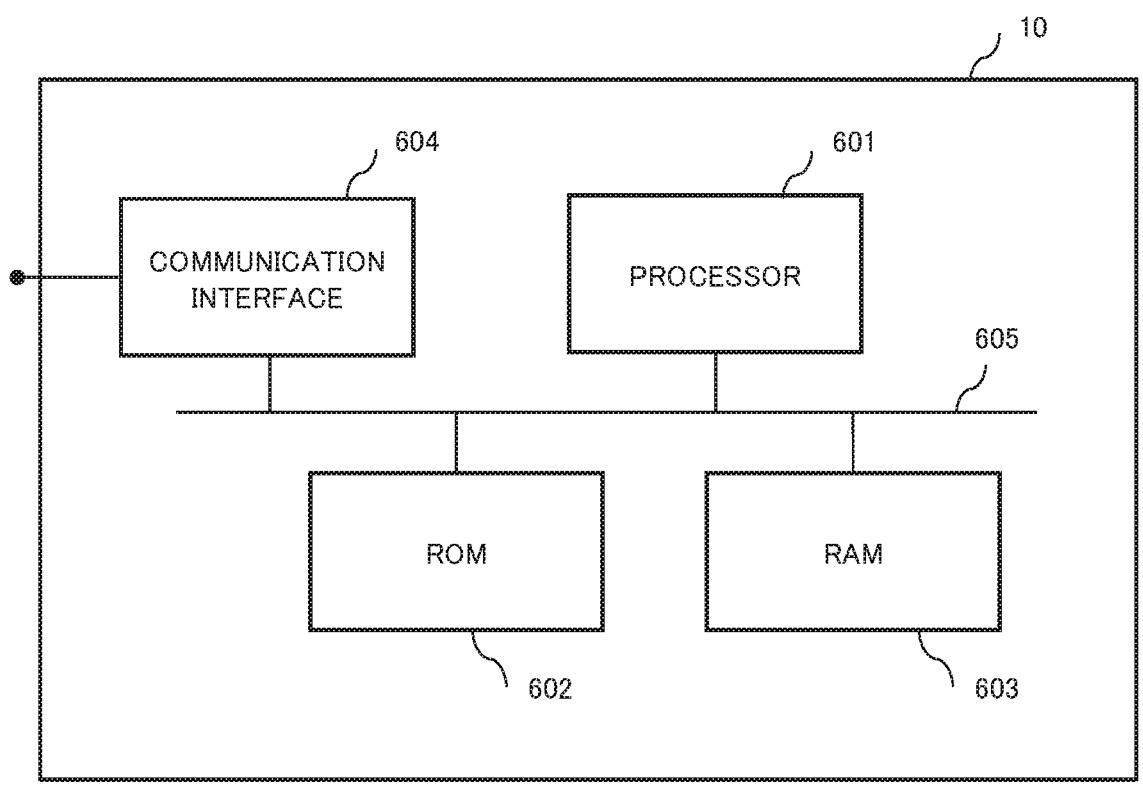
FIG. 15 is a hardware configuration diagram showing the internal configuration of the extraction device of the first example embodiment.

FIG. 15 is a hardware configuration diagram showing the internal configuration of the extraction device 10 of the first example embodiment. The extraction device 10 includes a processor 601 that performs control, a read only memory (ROM) 602 that stores a program and nonvolatile data, a random access memory (RAM) 603 that stores volatile data, a communication interface 604 that transmits and receives data, and an internal bus 605 to be used for communication in the device. The ECUs 31 of the first example embodiment, the detection device 20 of the second example embodiment, and the extraction device 40 and the detection device 50 of the third example embodiment can also be formed as devices using the hardware configuration shown in FIG. 15, like the extraction device 10 of the first example embodiment.

The respective components in the first, second, and third example embodiments are formed by the processor 601 acquiring and executing a program for achieving these functions. There are various modifications of the method of forming the extraction device 10. For example, the extraction device 10 may be formed with any combination of an information processing device and a program that vary with each component. Further, a plurality of components in the extraction device may be formed with any combination of one information processing device and a program.

Some or all of the components of each device are formed with other general-purpose or dedicated circuitry, processors, or combinations thereof. These components may be formed with a single chip, or may be formed with a plurality of chips connected via a bus. Some or all of the components of each device may be formed with a combination of the above circuits or the like and a program.

In a case where some or all of the components of each device are formed with a plurality of information processing devices, circuits, or the like, the plurality of information processing devices, circuits, or the like may be arranged in a centralized manner or in a dispersed manner. For example, information processing devices, circuits, or the like may be formed in the form of a client and server system, a cloud computing system, or the like in which the respective devices, circuits, or the like are connected via a communication network.

The present invention has been described so far, with reference to the above example embodiments as exemplary embodiments. However, the present invention is not limited to the example embodiments described above. That is, the present invention can be applied to various modes that can be understood by those skilled in the art within the scope of the invention.

REFERENCE SIGNS LIST 10, 40 extraction device
11 frame sorting unit
12, 42 rule extraction unit
20, 50 detection device
21, 51 determination unit
30 monitoring apparatus
421 cycle rule extraction unit
422 event rule extraction unit
511 cycle rule determination unit
512 event rule determination unit

What is claimed is:

1. A monitoring apparatus comprising:
an extraction device comprising:
at least one first memory configured to store instructions; and
at least one first processor configured to execute the instructions to:
sort each set of frames that have the same identifier associated with a node, into frames maintaining a cycle and frames out of the cycle;
extract, as an event rule, a feature of a bit change in a data field related to an event occurrence, from the frames that have the same identifier and are out of the cycle; and
exclude the frames that have the same identifier and maintain the cycle from the set of frames having the same identifier, and select the frames that are out of the cycle, and
a detection device that is communicably connected to the extraction device comprising:
at least one second memory configured to store instructions; and
at least one second processor configured to execute the instructions to:
determine a detection target frame out of the cycle to be an illegal frame when the data field of the detection target frame does not match the feature extracted by the extraction device and determine the detection target frame out of the cycle to be a normal frame when the data field of the detection target frame matches the feature extracted by the extraction device; and
update, after a frame out of the cycle is determined to be a normal frame, a base point of the cycle to a frame that is output at a time of an event occurrence,
wherein the feature of the bit change in the data field is that a bit at a specific position in the data field takes the same value before and after the event occurrence.

2. The extraction device according to claim 1, wherein the feature of the bit change in the data field is inversion of a bit at a specific position in the data field.

3. The extraction device according to claim 1, wherein the feature of the bit change in the data field is a combination of bits designated as 0 and 1 in the data field.

4. An extraction method comprising:
sorting frames that have the same identifier associated with a node, into frames maintaining a cycle and frames out of the cycle;
extracting, as an event rule, a feature of a bit change in a data field related to an event occurrence, from the frames that have the same identifier and are out of the cycle;
excluding the frames that have the same identifier and maintain the cycle from the set of frames having the same identifier, and select the frames that are out of the cycle;
determining a detection target frame out of the cycle to be an illegal frame when the data field of the detection target frame does not match the extracted feature and determine the detection target frame out of the cycle to be a normal frame when the data field of the detection target frame matches the extracted feature; and
updating, after a frame out of the cycle is determined to be a normal frame, a base point of the cycle to a frame that is output at a time of an event occurrence,
wherein the feature of the bit change in the data field is that a bit at a specific position in the data field takes the same value before and after the event occurrence.

5. A non-transitory computer-readable recording medium storing a program for causing a computer to:
- sort each set of frames that have the same identifier associated with a node, into frames maintaining a cycle and frames out of the cycle;
- extract, as an event rule, a feature of a bit change in a data field related to an event occurrence, from the frames that have the same identifier and are out of the cycle;
- exclude the frames that have the same identifier and maintain the cycle from the set of frames having the same identifier, and select the frames that are out of the cycle;
- determine a detection target frame out of the cycle to be an illegal frame when the data field of the detection target frame does not match the extracted feature and determine the detection target frame out of the cycle to be a normal frame when the data field of the detection target frame matches the extracted feature; and
- update, after a frame out of the cycle is determined to be a normal frame, a base point of the cycle to a frame that is output at a time of an event occurrence,
- wherein the feature of the bit change in the data field is that a bit at a specific position in the data field takes the same value before and after the event occurrence.

6. The extraction device according to claim 2, wherein the feature of the bit change in the data field is inversion of a bit at a specific position in the data field.

7. The extraction device according to claim 2, wherein the feature of the bit change in the data field is a combination of bits designated as 0 and 1 in the data field.

8. The extraction device according to claim 2, wherein the feature of the bit change in the data field is that a bit at a specific position in the data field takes the same value before and after the event occurrence.

* * * * *